United States Patent
Lee

(10) Patent No.: US 7,605,701 B2
(45) Date of Patent: Oct. 20, 2009

(54) ANTENNA SHARING APPARATUS FOR MOBILE COMMUNICATION TERMINAL AND METHOD THEREOF

(75) Inventor: Won-Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 242 days.

(21) Appl. No.: 11/461,012

(22) Filed: Jul. 31, 2006

(65) Prior Publication Data

US 2007/0030124 A1    Feb. 8, 2007

(30) Foreign Application Priority Data

Aug. 4, 2005    (KR) .................. 10-2005-0071446

(51) Int. Cl.
*G08B 13/14*    (2006.01)

(52) U.S. Cl. ............... 340/572.1; 340/10.1; 455/422.1; 455/556.1

(58) Field of Classification Search ... 340/572.1–572.9, 340/10.1, 10.3, 10.33; 455/422.1, 550.1, 455/414.1, 556.1, 130, 351; 370/310, 315, 370/316, 319, 321, 328
See application file for complete search history.

(56) References Cited

U.S. PATENT DOCUMENTS

| | | | |
|---|---|---|---|
| 4,979,170 A * | 12/1990 | Gilhousen et al. | 370/321 |
| 6,067,443 A * | 5/2000 | Fuller et al. | 340/7.58 |
| 6,292,671 B1 * | 9/2001 | Mansour | 455/518 |
| 6,782,251 B2 * | 8/2004 | Kagay, Jr. | 455/410 |
| 6,816,711 B2 * | 11/2004 | Standke et al. | 455/73 |
| 6,937,878 B2 * | 8/2005 | Kim et al. | 455/561 |
| 7,020,497 B2 * | 3/2006 | Deeds | 455/567 |
| 7,113,095 B2 * | 9/2006 | Kuzma et al. | 340/572.7 |
| 7,167,710 B2 * | 1/2007 | Thakkar et al. | 455/450 |
| 7,215,976 B2 * | 5/2007 | Brideglall | 455/552.1 |
| 2002/0067267 A1 * | 6/2002 | Kirkham | 340/572.7 |
| 2003/0219035 A1 * | 11/2003 | Schmidt | 370/478 |
| 2004/0127251 A1 | 7/2004 | Thakkar et al. | |
| 2005/0127156 A1 | 6/2005 | Yoo et al. | |
| 2005/0280545 A1 | 12/2005 | Ryou et al. | |
| 2006/0079180 A1 * | 4/2006 | Sinivaara | 455/41.2 |

FOREIGN PATENT DOCUMENTS

| KR | 10-2005-0053557 | 6/2005 |
|---|---|---|
| KR | 10-0605172 | 7/2006 |

OTHER PUBLICATIONS

English Language Abstract of JP 10-2005-0059814.
English Language Abstract of JP 10-2005-0053557.

* cited by examiner

*Primary Examiner*—Daniel Previl
(74) *Attorney, Agent, or Firm*—Birch, Stewart, Kolasch & Birch, LLP

(57) ABSTRACT

A mobile communication terminal includes a first transceiver that transmits and receives signals, an RFID transceiver that transmits and receives signals, and a controller that stops the first transceiver while it is performing signal communication, and activates the RFID transceiver.

19 Claims, 3 Drawing Sheets

ANTENNA SHARING APPARATUS FOR MOBILE COMMUNICATION TERMINAL AND METHOD THEREOF

This application claims the benefit of Korean Patent Application No. 10-2005-0071446, filed on Aug. 4, 2005, which is hereby incorporated by reference in its entirety.

BACKGROUND OF THE INVENTION

1. Field of the Invention

The present invention relates to a mobile communication terminal, and more particularly, to an antenna sharing apparatus for a mobile communication terminal which performs a radio frequency identification (RFID) function, and a method thereof.

2. Description of the Background Art

Some conventional mobile communication terminals are provided with enhanced communication functions, such as a wireless Internet function, a video on demand (VOD) function, a text and/or multimedia messaging function, or a wireless online game function. Some conventional mobile communication terminals are also provided with supplemental, non-communication functions, such as a camera function, a memo writing function, a schedule managing function, a bell sound function, or a wake-up call function.

Radio frequency identification (RFID) is an identification method which can be used to identify objects, such as, but not limited to products, animals, or human beings. RFID operates by integrating an electromagnetic or electrostatic coupling into a wireless frequency of an electrostatic spectrum. An advantage of RFID is that a direct contact with an RFID system or a scanning on a visible bandwidth is not required. An RFID system is typically composed of an antenna, a transceiver (also referred to as reader) and a tag (also referred to as a transponder). The antenna is connected to the transponder, which is activated when the antenna receives a radio frequency electric wave.

When the transponder is activated, it transmits data to the reader through the antenna. The reader may be connected to a controller, such as a programmable logic controller (PLC), used for various applications. For example, the controller may be used to track the entry of objects through a door, or update sales information in a database.

RFID may operate using low frequencies or high frequencies. Low frequencies (approximately 30 KHz-500 KHz) are typically used when communicating across short distances, at approximately 1.8 m or less. High frequencies (approximately 850 MHz-950 MHz or 2.4 GHz-2.5 GHz) are typically used when communicating across longer distances.

An RFID reader can be integrated, or attached to, a mobile communication terminal. If the RFID reader utilizes a frequency close to a frequency used by the mobile communication terminal for other communications, the RFID reader can share an antenna with the transceiver the mobile communication terminal uses for other communications. For example, a code division multiple access (CDMA) communication scheme is utilized in Korea for mobile communications, if an RFID reader operating on a frequency of approximately 900 MHz is integrated with a mobile communication terminal, a single antenna can be shared between the mobile communication terminal's CDMA transceiver and the RFID reader.

However, sharing an antenna between the CDMA transceiver and the RFID reader presents a problem, in that both cannot use the antenna simultaneously. Providing two separate antennas is not an optimum solution, since a minimum distance must be provided between the antennas to prevent signal interference, which necessarily increases the size of the mobile communication terminal.

SUMMARY OF THE INVENTION

In view of the foregoing, the present invention, through one or more of its various aspects, embodiments, and/or specific features or sub-components, is thus intended to bring out one or more of the advantages as specifically noted below.

An object of the present invention is to provide an antenna sharing apparatus for a mobile communication terminal which allows an RFID module to share an antenna with a transceiver used for other mobile communications, and a method thereof.

To achieve at least this object, there is provided a mobile communication terminal which includes a first transceiver that transmits and receives signals, an RFID transceiver that transmits and receives signals, and a controller that stops the first transceiver while it is performing signal communication, and activates the RFID transceiver.

The mobile communication terminal may also include a duplexer that alternately connects an antenna to the first transceiver and the RFID transceiver. The signal communication may be performed by the first transceiver may be a voice call communicated using CDMA. The controller may control whether an antenna is connected to the first transceiver or the RFID transceiver.

The controller may connect the first transceiver to an antenna when the mobile communication terminal is in an idle mode, and connect the RFID transceiver to the antenna when the mobile communication terminal is in a sleep mode. The controller may connect the RFID module to an antenna for a predetermined time period while the mobile communication terminal is in a calling state. The controller may periodically connect the REID module to the antenna according to a slot cycle of the mobile communication terminal. The controller may connect the RFID module to the antenna for a predetermined time period during a sleep mode. The mobile communication terminal does not communicate with a base station during the sleep mode. The RFID transceiver may communicate with a transponder.

There is also provided a method for sharing an antenna of a mobile communication terminal which includes determining whether the mobile communication terminal is in a calling state, controlling a connection of an antenna between a first transceiver and an RFID transceiver according to whether the mobile communication terminal is in a calling state, and activating the RFID transceiver.

Controlling the connection of the antenna may include connecting the antenna to the first transceiver when the mobile communication terminal is in an idle mode, and connecting the antenna to the RFID module when the mobile communication terminal is in a sleep mode. The RFID transceiver may be connected to the antenna for a predetermined time period during the sleep mode. Controlling the connection of the antenna may include periodically stopping communication by the first transceiver when the mobile communication terminal is in a calling state, and connecting the RFID transceiver to the antenna. The RFID transceiver may be periodically connected to the antenna according to a slot cycle of the mobile communication terminal. The RFID may communicate with a transponder.

There is also provided a method for sharing an antenna of a mobile communication terminal which includes temporarily stopping call traffic communication during a calling state of the mobile communication terminal, activating an RFID transceiver to perform RFID communication while the call traffic communication is temporarily stopped, and re-starting the call traffic communication when the RFID communication is completed.

The RFID transceiver may be activated according to a slot cycle of the mobile communication terminal.

There is also provided a computer-readable medium which stores a program for sharing an antenna of a mobile communication terminal, in which the program includes determination code that determines whether the mobile communication terminal is in a calling state, and control code that controls a connection of an antenna between a first transceiver and an RFID transceiver according to whether the mobile communication terminal is in a calling state.

There is also provided a computer-readable medium which stores a program for sharing an antenna of a mobile communication terminal, in which the program includes stopping code that temporarily stops call traffic communication during a calling state of the mobile communication terminal, activating code that activates an RFID transceiver to perform RFID communication while the call traffic communication is temporarily stopped, and re-starting code that re-starts the call traffic communication when the RFID communication is completed.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF THE INVENTION

Figure 1:
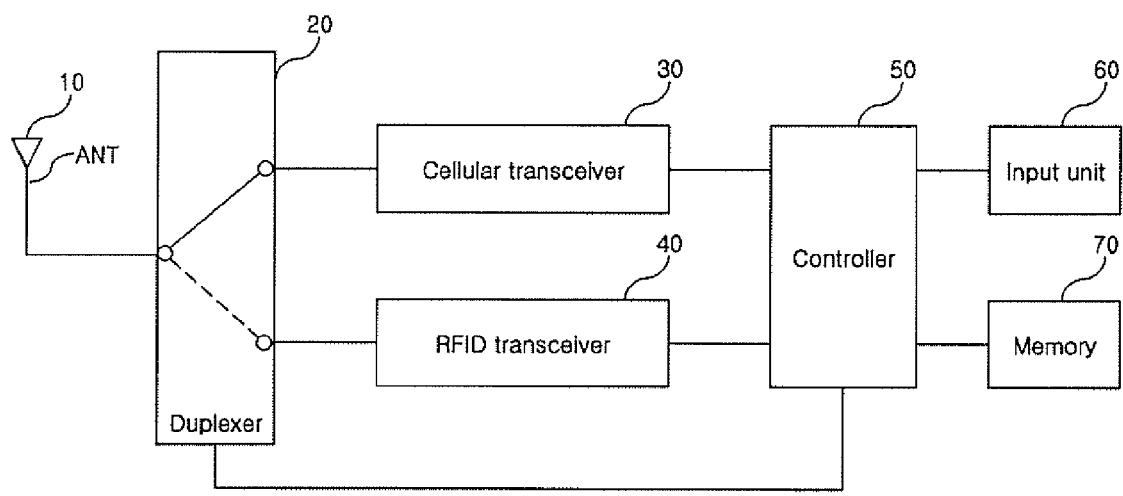
FIG. 1 is a block diagram showing a mobile communication terminal having an antenna sharing apparatus according to one aspect of the present invention.

FIG. 1 is a block diagram showing a mobile communication terminal having an antenna sharing apparatus according to one aspect of the present invention.

The mobile communication terminal shown in FIG. 1 includes an antenna 10 that receives radio frequency signals from a transponder of an RFID system and a base station of a cellular system (not shown), a cellular transceiver 30 which communicates with the cellular system, an RFID transceiver 40 which communicates with the RFID system, a duplexer 20 which alternately connects the antenna 10 to the cellular transceiver 30 and the RFID transceiver 40, a controller 50 which controls the operation of the duplexer 20, an input unit 60 and a memory 70. The cellular transceiver 30 is configured to communicate with a cellular system, such as, but not limited to, for example, a CDMA, TDMA, GSM or iDEN system.

Hereinafter, an operation of an antenna sharing apparatus for a mobile communication terminal according to an aspect of the present invention will be explained with reference to FIG. 1.

When the cellular transceiver 30 is in a waiting state (i.e., is not performing a voice or data call), it periodically enters into an idle mode, and then a sleep mode. When the cellular transceiver 30 is in the idle mode, it "wakes up" to listen for messages from a base station of the cellular system (such as, for example, paging messages indicating an incoming call, or messages containing other control information). When the cellular transceiver 30 is in the sleep mode, it does not listen for messages from the base station. The controller 50 controls the duplexer 20 to connect the cellular transceiver 30 to the antenna 10 while the cellular transceiver 30 is in the idle mode, and to connect the RFID transceiver 40 to the antenna 10 while the cellular transceiver 30 is in the sleep mode (thus activating the RFID transceiver 40).

When the cellular transceiver 30 is in a calling state (i.e., the cellular transceiver 30 is performing a voice or data call), the controller 50 controls the duplexer 20 to periodically switch the connection to the antenna 10 between the cellular transceiver 30 and the RFID transceiver 40. That is, the controller 50 first controls the cellular transceiver 30 to send or receive call traffic signals during a first period. During the first period, the antenna 10 is connected to the cellular transceiver 30, and thus, the RFID transceiver is not activated. During a second period, the controller 50 controls the cellular transceiver 30 to halt the communication of call traffic signals, and controls the duplexer 20 to connect the antenna 10 to the RFID transceiver 40, thus activating the RFID transceiver 40. After a predetermined period of time, the controller 50 controls the duplexer 20 to reconnect the antenna 10 to the cellular transceiver 30 (thus, deactivating the RFID transceiver 40), and controls the cellular transceiver 30 to continue sending or receiving call traffic signals. This switching of the duplexer 20 repeats in a periodic manner. Thus, while the cellular transceiver 30 is in a calling state, the cellular transceiver 30 and the RFID transceiver 40 share the antenna 10 in a time-division manner.

The timing of the duplexer 20 switching can be set based on a slot cycle index of the mobile communication terminal. Generally, a slot cycle index determines how often a mobile communication terminal enters into an idle mode, while it is in a waiting state, to listen for messages from a base station. Table 1 shows the slot cycles that are used by a CDMA mobile communication terminal. As shown in Table 1, when a slot cycle index is 0, the CDMA slot cycle is 1.28 seconds, when the slot cycle index is 1, the CDMA slot cycle is 2.56 seconds, and when the slot cycle index is 2, the CDMA slot cycle is 5.16 seconds. Thus, if a mobile communication terminal is set to a slot cycle index of 2, when the mobile communication terminal is in a waiting state, it enters into an idle mode every 5.16 seconds.

TABLE 1

| Slot cycle (Index) | Slot cycle (Sec) |
|---|---|
| 2 | 5.16 |
| 1 | 2.56 |
| 0 | 1.28 |

Figure 2:
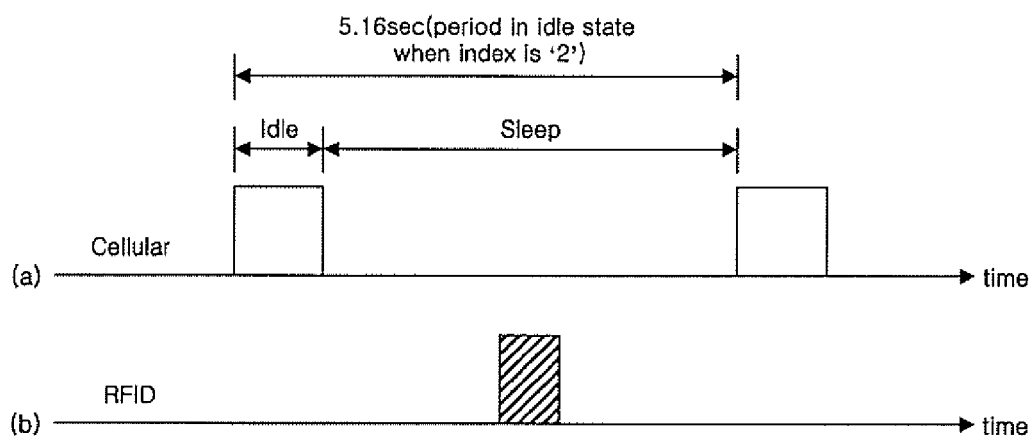
FIG. 2 is a timing diagram illustrating an example of timing of a cellular transceiver and an RFID transceiver during a waiting state of a mobile communication terminal, according to an aspect of the present invention.

FIG. 2 is a timing diagram illustrating an example of timing of the cellular transceiver 30 and the RFID transceiver 40 during a waiting state of the mobile communication terminal, according to an aspect of the present invention.

In the embodiment illustrated in FIG. 2, a mobile communication terminal is set to have a slot cycle of 5.12 seconds. Thus, while the mobile communication terminal is in a waiting state, it enters into an idle mode every 5.12 seconds. It stays in the idle mode just long enough to listen for messages from a base station, and then returns to a sleep mode. The controller 50 controls the duplexer 20 to connect the antenna 10 to the cellular transceiver 30 while the mobile communication terminal is in an idle mode. After the mobile communication terminal goes into a sleep mode, the controller 50 controls the duplexer 20 to connect the antenna 10 to the RFID transceiver 40, and thus, activate the RFID transceiver 40, for a predetermined period of time. To minimize the power consumed by the activation of the RFID transceiver 40, the predetermined period of time can be selected to be only as large as necessary.

Figure 3:
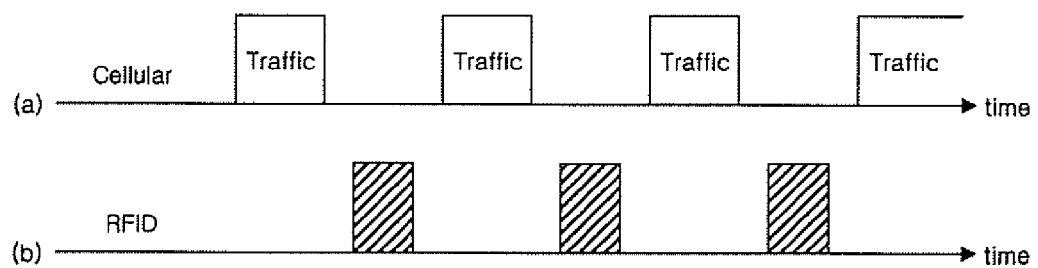
FIG. 3 is a timing diagram illustrating an example of timing of a cellular transceiver and an RFID transceiver during a calling state of a mobile communication terminal, according to an embodiment of the present invention.

FIG. 3 is a timing diagram illustrating an example of timing of the cellular transceiver 30 and the RFID transceiver 40 during a calling state of the mobile communication terminal, according to an embodiment of the present invention.

When the mobile communication terminal is in a calling state, the cellular transceiver 30 transmits and receives call traffic signals with a base station. As discussed above, when the mobile communication terminal is in a calling state, the antenna 10 is shared by the cellular transceiver 30 and the RFID transceiver 40 by the duplexer 20 periodically switching the connection to the antenna 10 between the cellular transceiver 30 and the RFID transceiver 40. In an embodiment of the present invention, the period in which the RFID transceiver 40 is connected to the antenna 10 during the calling state can correspond to the period in which the RFID transceiver 40 is connected to the antenna 10 during the waiting state. For example, in the embodiment illustrated in FIG. 2, during the waiting state, the RFID transceiver 40 is connected to the antenna 10 for a predetermined period of time every 5.12 sec. During the calling state, the duplexer 20 can continue to connect the RFID transceiver 40 to the antenna 10 for the predetermined period of time every 5.12 sec. When the RFID transceiver 40 is not connected to the antenna 10 during the calling state, the cellular transceiver 30 can exchange call traffic signals with a base station. The controller 50 may be responsible for determining when the mobile communication terminal is in a calling state and when it is in a waiting state, by periodically checking whether a voice or data call is being performed.

Figure 4:
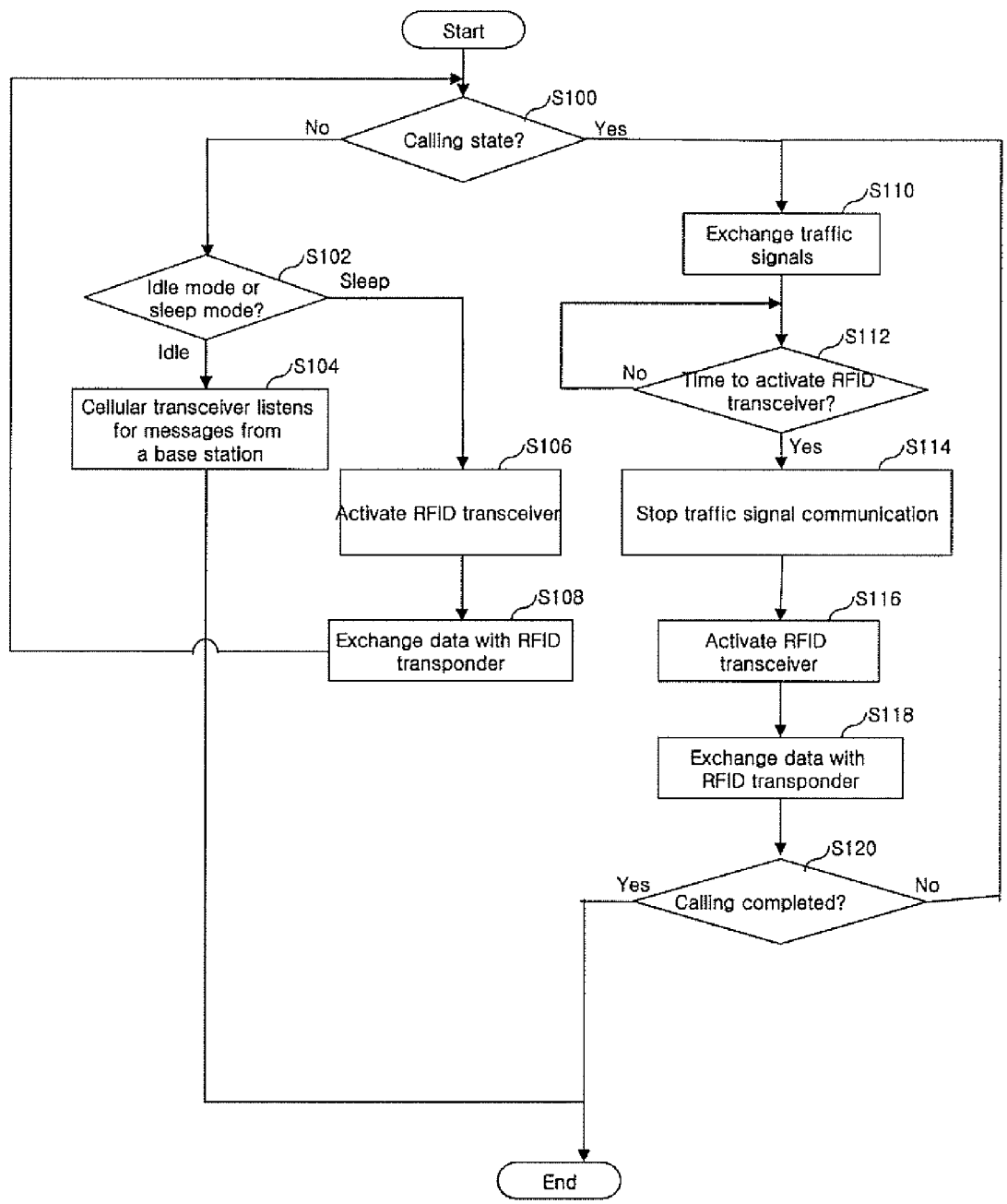
FIG. 4 is a flowchart showing a method for sharing an antenna of a mobile communication terminal according to an embodiment of the present invention.

FIG. 4 is a flowchart showing an example of sharing an antenna of a mobile communication terminal according to an embodiment of the present invention.

When the mobile communication terminal is in an idle mode during a waiting state, the mobile communication terminal listens for messages from a base station of a cellular system via cellular transceiver 30 (steps S100, S102, and S104). However, when the mobile communication terminal is in a sleep mode during a waiting state, an RFID transceiver 40 is activated to exchange data with a transponder (steps S102, S106 and S108).

When the mobile communication terminal is in a calling state, the cellular transceiver 30 exchanges call traffic signals with a base station (steps S100, S110). When it is time to activate the RFID transceiver 40 (step S112), the cellular transceiver 30 stops the exchange of traffic signals (step S114), the RFID transceiver 40 is activated (step S116), and then the RFID transceiver 40 exchanges signals with a transponder (step S118). The controller 50 then determines whether the call has been completed (step S120). If the call has not been completed, the controller 50 controls the duplexer 20 to reconnect the antenna 10 to the cellular transceiver 30, and the process returns to step S110. If the call has been completed, the process ends, and is then repeated, beginning with step S100.

The antenna sharing apparatus described above allows one antenna to be shared by a cellular transceiver and an RFID transceiver in a time-division manner. As a result, a mobile communication terminal can be provided with additional functionality, without experiencing signal interference. Although the embodiment described above is applied in a cellular system, the present invention is not so limited, and is also applicable to other wireless systems, such as, but not limited to, a cordless telephone system.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

In accordance with various embodiments of the present disclosure, the methods described herein may be implemented by software programs executable by a processor. The present disclosure contemplates a computer-readable medium that includes instructions or receives and executes instructions responsive to a propagated signal. The term "computer-readable medium" shall include any medium that is capable of storing, encoding or carrying a set of instructions for execution by a processor to perform any one or more of the methods or operations disclosed herein.

In a particular non-limiting, exemplary embodiment, the computer-readable medium can include a solid-state memory such as, for example, a memory card or other package that houses one or more non-volatile read-only memories. Further, the computer-readable medium may be a random access memory or other volatile re-writable memory. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to an exemplary embodiment, it is understood that the words that have been used are words of description and illustration, rather than words of limitation. As the present invention may be embodied in several forms without departing from the spirit or essential characteristics thereof, it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile communication terminal, comprising:
    a first transceiver that selectively transmits and receives signals;
    an RFID transceiver that selectively transmits and receives signals;
    a controller that halts an operation of the first transceiver while said mobile communication terminal is performing a signal communication, and activates the RFID transceiver; and
    a duplexer that alternately connects an antenna to the first transceiver and the RFID transceiver,
    wherein the controller deactivates the RFID transceiver while the mobile communication terminal is in an idle mode, and activates the RFID transceiver for a predetermined time slot period when the mobile communication terminal is in a sleep mode.

2. The mobile communication terminal of claim 1, wherein the signal communication performed by the first transceiver is a voice call communicated using CDMA.

3. The mobile communication terminal of claim 1, wherein the controller controls whether the antenna is connected to the first transceiver or the RFID transceiver.

4. The mobile communication terminal of claim 1, wherein the controller connects the first transceiver to the antenna when the mobile communication terminal is in the idle mode, and connects the RFID transceiver to the antenna when the mobile communication terminal is in the sleep mode.

5. The mobile communication terminal of claim 1, wherein the controller connects the RFID module to the antenna for a predetermined time period while the mobile communication terminal is in a calling state.

6. The mobile communication terminal of claim 5, wherein the controller periodically connects the RFID module to the antenna according to a slot cycle of the mobile communication terminal.

7. The mobile communication terminal of claim 5, wherein the controller connects the RFID module to the antenna for the predetermined time slot period during the sleep mode.

8. The mobile communication terminal of claim 7, wherein the mobile communication terminal does not communicate with a base station during the sleep mode.

9. The mobile communication terminal of claim 1, wherein the RFID transceiver communicates with a transponder.

10. A method for sharing an antenna of a mobile communication terminal, comprising:
    determining whether the mobile communication terminal is in a calling state;
    controlling a connection of an antenna to a first transceiver and a connection of the antenna to an RFID transceiver in response to the determination of whether the mobile communication terminal is in the calling state;
    deactivating the RFID transceiver while the mobile communication terminal is in an idle mode; and
    activating the RFID transceiver for a predetermined time slot period when the mobile communication terminal is in a sleep mode.

11. The method of claim 10, wherein controlling the connection of the antenna comprises connecting the antenna to the first transceiver when the mobile communication terminal is in the idle mode, and connecting the antenna to the RFID transceiver when the mobile communication terminal is in the sleep mode.

12. The method of claim 11, wherein the RFID transceiver is connected to the antenna for the predetermined time slot period during the sleep mode.

13. The method of claim 10, wherein controlling the connection of the antenna comprises periodically stopping a communication by the first transceiver when the mobile communication terminal is in the calling state, and connecting the RFID transceiver to the antenna.

14. The method of claim 13, wherein the RFID transceiver is periodically connected to the antenna according to a slot cycle of the mobile communication terminal.

15. The method of claim 10, wherein the RFID transceiver communicates with a transponder.

16. A method for sharing an antenna of a mobile communication terminal, comprising:
    temporarily stopping call traffic communication during a calling state of the mobile communication terminal;
    activating an RFID transceiver to perform RFID communication only while the call traffic communication is temporarily stopped;
    re-starting the call traffic communication when the RFID communication is completed;
    deactivating the RFID transceiver while the mobile communication terminal is in an idle mode; and
    activating the RFID transceiver for a predetermined time slot period when the mobile communication terminal is in a sleep mode.

17. The method of claim 16, wherein the RFID transceiver is activated during the calling state according to a slot cycle of the mobile communication terminal.

18. A computer-readable storage medium which stores a program for sharing an antenna of a mobile communication terminal, the computer-readable storage medium comprising:
    a determination code segment that determines whether the mobile communication terminal is in a calling state;
    a control code segment that controls a connection of an antenna to a first transceiver and a connection of the antenna to an RFID transceiver according to whether the mobile communication terminal is in the calling state;
    a code segment that deactivates the RFID transceiver while the mobile communication terminal is in an idle mode; and a code segment that activates the RFID transceiver for a predetermined time slot period when the mobile communication terminal is in a sleep mode.

19. A computer-readable storage medium which stores a program for sharing an antenna of a mobile communication terminal, the computer-readable storage medium comprising:

a stopping code segment that temporarily stops call traffic communication during a calling state of the mobile communication terminal;

an activating code segment that activates an RFID transceiver to perform RFID communication only while the call traffic communication is temporarily stopped;

a re-starting code segment that re-starts the call traffic communication when the RFID communication is completed;

a code segment that deactivates the RFID transceiver while the mobile communication terminal is in an idle mode; and a code segment that activates the RFID transceiver for a predetermined time slot period when the mobile communication terminal is in a sleep mode.

* * * * *